United States Patent [19]

Thurlow, II

[11] 4,071,764

[45] Jan. 31, 1978

[54] GAMMA AND ALPHA COMPENSATED FISSION CHAMBER

[75] Inventor: Norman C. Thurlow, II, Horseheads, N.Y.

[73] Assignee: Westinghouse Electric Corporation, Pittsburgh, Pa.

[21] Appl. No.: 719,212

[22] Filed: Aug. 31, 1976

[51] Int. Cl.$^2$ .................................... G01T 3/00

[52] U.S. Cl. .................................... 250/390; 250/392

[58] Field of Search .................................... 250/390, 392

[56] References Cited

U.S. PATENT DOCUMENTS

| | | | |
|---|---|---|---|
| 2,976,418 | 3/1961 | Johnson | 250/390 |
| 3,898,466 | 8/1975 | Kawashima | 250/392 |

*Primary Examiner*—Harold A. Dixon

*Attorney, Agent, or Firm*—W. G. Sutcliff

[57] ABSTRACT

A fission chamber neutron detector which is both gamma and alpha compensated. The alpha compensation is provided by inclusion of a low neutron cross section, alpha particle emissive isotope within the gamma compensation portion of the fission chamber.

4 Claims, 1 Drawing Figure

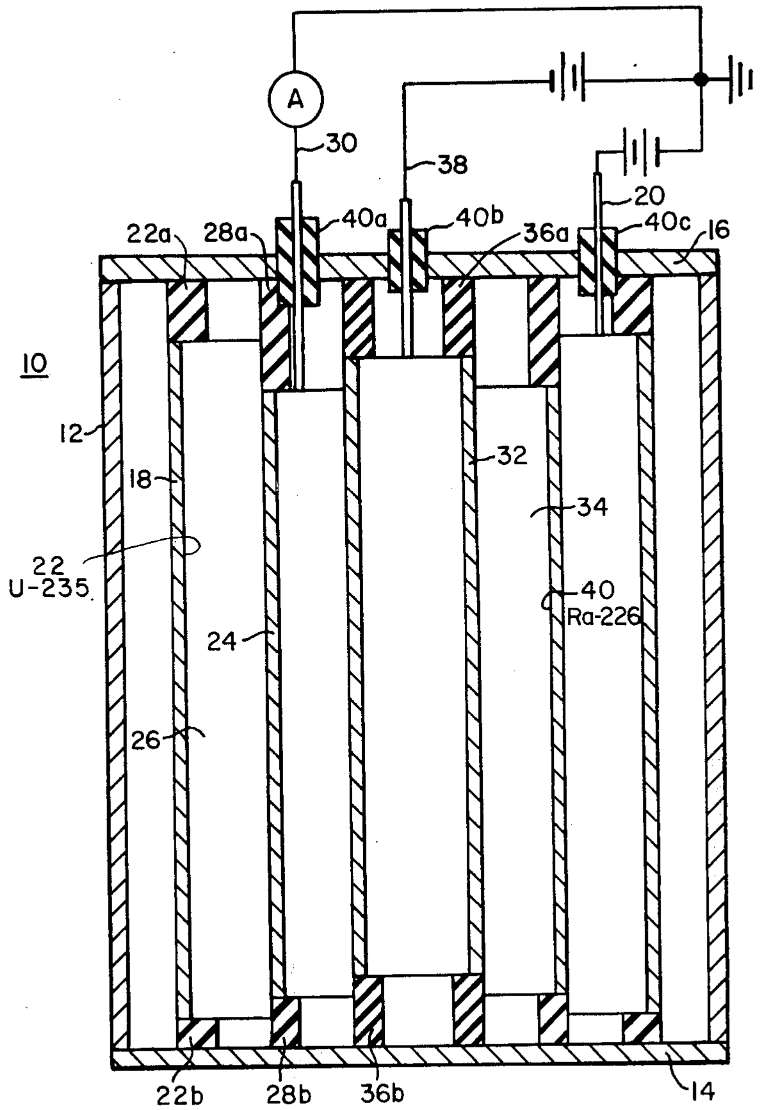
A
30
38
20
40a
40b
40c
36a
16
22a
28a
10
12
18
22
U-235
24
26
32
34
40
Ra-226
22b
28b
36b
14

GAMMA AND ALPHA COMPENSATED FISSION CHAMBER

BACKGROUND OF THE INVENTION

The present invention relates to neutron radiation detection tubes which are electronic devices which permit the passage of electrical current between electrodes when the device is exposed to the penetrating neutron radiation. More particularly, the present invention is directed to fission chamber type neutron detectors. In such a device, a high neutron cross section fissionable material such as uranium-235 is disposed within the hermetically sealed, gas filled electronic device, so that penetrating neutrons will produce further fission with the uranium-235 to produce ionization within the gas fill of the device. Such ionization produces the electrical current between the electrodes. Such fission chamber type detectors are typically used in mid-range to high range neutron flux levels. The detector tube output is proportional to the incident neutron flux and it is read directly on a DC current indicating device.

Gamma photons which may accompany the neutron flux may be compensated for by provision of a gamma compensation chamber which is typically coaxial with the fission material containing neutron chamber of the radiation detector tube. Such gamma compensation devices are well known and a typical device is set forth in U.S. Pat. No. 2,852,694. Such gamma-compensated ionization chambers are well known and reduce the signal due to gamma flux. The compensation is achieved by providing in effect two chamber volumes, one of which is sensitive to neutrons and to gamma flux, while the other is sensitive only to gamma flux. The effective gamma sensitivity of these two volumes is made equal. The output signals from the volumes are combined with opposite polarity and the signals due to gamma flux cancel each other.

The minimum neutron flux detectable by such a gamma-compensated fission chamber is determined by the magnitude of the alpha current produces by alpha particles emitted from the fissionable material within the fission chamber. Such a gamma-compensated fission chamber will typically only be effective down to a neutron flux level of $10^6$ neutrons per square centimeter per second. The alpha particles ionize the gas fill in the chamber and produce a constant DC current which biases any neutron current resulting from the neutron-absorption producing-fission process within the chamber. It is desirable to be able to extend the operating range of such fission chambers to lower neutron levels. The present disclosure describes a structure in which alpha compensation can be produced as well as the gamma compensation.

SUMMARY OF THE INVENTION

A fission chamber neutron detector is disclosed which is both gamma and alpha compensated to extend the range of operation and improve the accuracy and linearity of the detector. The detector comprises a neutron sensitive volume which includes a high neutron cross section fissionable material and a predetermined gas fill, with at least two electrical signal electrodes within this neutron sensitive volume. The detector includes a gamma and alpha signal compensation volume which includes a low neutron cross section alpha particle emissive isotope. This volume is also gas filled and includes at least two compensation output signal electrodes. The respective volume electrical signals are combinable to give a resultant gamma and alpha compensated signal. The neutron sensitive volume and the gamma and alpha signal compensation volume can share a common electrical signal electrode as in the embodiment described hereafter.

BRIEF DESCRIPTION OF THE DRAWINGS

The sole FIGURE is a schematic representation of a sectional view of an embodiment of the compensated fission chamber neutron detector of the present invention.

DESCRIPTION OF THE PREFERRED EMBODIMENTS

The fission chamber neutron detector 10 comprises an outer casing hermetically sealed envelope 12, which is typically a thin aluminum tubular member which is sealed at both ends 14 and 16. The envelope 12 has a predetermined ionizable gas fill such as nitrogen, or other well known gas or combination of gases.

A first cylindrical electrode 18 is disposed coaxially within the envelope 12 and spaced therefrom. An output signal lead 20 is brought from electrode 18 out through end 16 of the detector envelope, with lead 20 insulated as it passes through end 16. The electrode 18 is supported within the envelope 12 by insulating spacers 22*a* and 22*b* which extend from the ends 14 and 16.

A second coaxial electrode 24 is disposed spaced from the electrode 18, with the volume 26 between these electrodes comprising a neutron sensitive volume. The second electrode 24 is supported within the envelope by insulating spacers 28*a*, 28*b*. An output signal lead 30 is connected to electrode 24 and is brought through end 16. A layer 22 of high neutron cross section fissionable material, such as uranium-235 is disposed on the interior surface of electrode 18 or on the exterior surface of electrode 24. The volume 26 is filled with ionizable gas and thus is neutron sensitive and also gamma sensitive.

A third electrode 32 is disposed coaxially within the volume defined by the second electrode 24, and a compensation volume 34 is defined between electrodes 24 and 32. Electrode 32 is supported at either end by insulating spacers 36*a*, 36*b*. A compensation output signal lead 38 is connected to electrode 32 and brought through end 16. The compensation volume 34 is likewise gas filled and may communicate with the other gas filled volume. Compensation output lead 38 and output lead 20 are connected to high voltage sources of opposite polarity. The other output lead 30 is connected to ground via a direct current ammeter A. The respective output signal leads 30, 38, and 20 are sealingly brought through end wall 16 via insulating feedthroughs 40*a*, 40*b*, 40*c*.

The respective cylindrical electrical signal electrodes 18, 24, 32 and envelope 12 in cross section would be seen as coaxial cylinders, with envelope 12 being the largest, then with electrode 18 coaxially spaced within envelope 12, and electrode 24 coaxially spaced within electrode 18, and electrode 32 coaxially spaced within electrode 24. The electrode 24 serves as a common electrode for both the neutron sensitive volume 34, and the gamma and alpha compensation volume 26.

An alpha particle emissive low neutron cross section isotope layer 40 is disposed on the interior wall of the electrode 24, and/or the exterior wall of the electrode 32 within the compensation chamber 34. The introduction of this alpha particle emitter into the compensation volume will produce an alpha current with a polarity opposite to that of the alpha current from the neutron chamber volume. The alpha particle emissive isotope must not have a fission cross section large enough to interfere with the neutron signal generated in the neutron chamber. The isotope must have sufficient activity to provide an alpha particle flux which approximates that from the fissionable material provided in the neutron chamber. The isotope must be relatively stable and not transmuted to an inoperative isotope. Such a low neutron cross section alpha particle emissive isotope is radium-226. In a specific embodiment of the present invention, where uranium-235 is utilized as the fissionable material in the neutron chamber, a typical amount for use would be about 1.68 grams, and the amount of radium-226 which would alpha compensate for this amount of uranium-235 is about 3.6 micrograms. The preferred weight ratio of uranium-235 to radium-226 is thus about $4 \times 10^5$.

The gamma emission from the radium 226 can be neglected since it is coincident with only about 6% of the alpha particle events.

The compensation of the alpha and gamma currents by the provision of the described structure will lower the minimum operating flus for such a fission chamber neutron detector when operated in the chamber mode, such that the operating range extends to lower neutron fluxes than could be detected by an uncompensated fission chamber. The extended range of compensated chamber in the direct current mode overlaps the operating range of the same chamber used in the counting mode, thereby providing a single detector that can monitor the source, intermediate, and power ranges of a nuclear reactor. Prior art methods require the use of two or more detectors or special signal processing equipment to cover these three reactor operating ranges.

I claim:

1. A fission chamber neutron detector comprising, a neutron sensitive volume which volume includes a high neutron cross section fissionable material and a predetermined gas fill with at least two electrical signal electrodes within the neutron sensitive volume, and a gamma and alpha signal compensation volume which volume includes a low neutron cross section alpha particle emissive isotope and a predetermined gas fill, with at least two compensation electrical signal electrodes within the compensation volume, whereby the respective volume output signals are combinable to give a resultant gamma and alpha compensated signal.

2. The fission chamber specified in claim 1, wherein the high neutron cross section fissionable material is uranium-235.

3. The fission chamber specified in claim 1, wherein the low neutron cross section alpha emissive isotope is radium-226.

4. The fission chamber specified in claim 1, wherein the low neutron cross section fissionable material is uranium-235 and the low neutron cross section alpha emissive material is radium-226, and the weight ratio of uranium-235 to radium-226 is about $4 \times 10^5$.

* * * * *